United States Patent
Garrido López

(10) Patent No.: US 10,049,585 B2
(45) Date of Patent: Aug. 14, 2018

(54) METHOD AND SYSTEM OF CONTROLLING A FLIGHT OF AN AIRCRAFT SUBJECTED TO A REQUIRED TIME OF ARRIVAL CONSTRAINT

(71) Applicant: The Boeing Company, Chicago, IL (US)

(72) Inventor: David Garrido López, Madrid (ES)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/192,238

(22) Filed: Jun. 24, 2016

(65) Prior Publication Data

US 2016/0379500 A1    Dec. 29, 2016

(30) Foreign Application Priority Data

Jun. 26, 2015   (EP) .................................... 15382337

(51) Int. Cl.
| | | |
|---|---|---|
| *G08G 5/00* | (2006.01) | |
| *G05D 1/10* | (2006.01) | |
| *G05D 1/06* | (2006.01) | |
| *G06F 19/00* | (2018.01) | |

(52) U.S. Cl.
CPC ......... *G08G 5/0039* (2013.01); *G05D 1/0676* (2013.01); *G05D 1/101* (2013.01)

(58) Field of Classification Search
CPC ..... G08G 5/0039; G05D 1/0676; G05D 1/101
See application file for complete search history.

(56) References Cited

U.S. PATENT DOCUMENTS

| | | |
|---|---|---|
| 5,121,325 A | 6/1992 | DeJonge |
| 6,507,782 B1 | 1/2003 | Rumbo et al. |
| 7,283,895 B2 | 10/2007 | Bouchet |
| | (Continued) | |

FOREIGN PATENT DOCUMENTS

EP         2924530         9/2015

OTHER PUBLICATIONS

Extended European Search Report, issued by the European Patent Office in connection with European Patent Application No. 15382337.2, dated Mar. 2, 2016, 15 pages.

(Continued)

*Primary Examiner* — Adam D Tissot
(74) *Attorney, Agent, or Firm* — Hanley, Flight and Zimmerman, LLC

(57) ABSTRACT

Example systems and methods for controlling a flight of an aircraft subjected to a required time of arrival constraint at a target waypoint and to an additional flight criterion are disclosed herein. An example method includes calculating combinations of cruise speed and descent speed for estimated times of arrival (ETAs) at the target waypoint and determining a subset of the combinations that introduce substantially a same amount of time change in the ETA when changing the corresponding cruise speed to a cruise speed limit as when changing the corresponding descent speed to a descent speed limit. The example method also includes selecting a combination of the subset of the combinations having an ETA substantially equal to the RTA and modifying at least one of a cruise speed or a descent speed of the aircraft based on the selected combination.

20 Claims, 12 Drawing Sheets

(56) References Cited

U.S. PATENT DOCUMENTS

| | | | |
|---|---|---|---|
| 7,623,960 B2 | 11/2009 | Wise et al. | |
| 7,756,632 B2 | 7/2010 | Wise et al. | |
| 8,010,267 B2 | 8/2011 | Klooster et al. | |
| 8,150,565 B2 | 4/2012 | Wachenheim et al. | |
| 8,150,588 B2 | 4/2012 | Klooster | |
| 8,311,687 B2 | 11/2012 | Bakker | |
| 8,321,071 B2 | 11/2012 | Klooster | |
| 8,332,145 B2 | 12/2012 | Dacre-Wright et al. | |
| 8,340,843 B2 | 12/2012 | Coulmeau et al. | |
| 8,352,169 B2 | 1/2013 | Coulmeau et al. | |
| 8,442,707 B2 | 5/2013 | Ledesma et al. | |
| 8,473,120 B2 | 6/2013 | Blanchon et al. | |
| 8,676,403 B2 | 3/2014 | Garrido-Lopez et al. | |
| 8,718,933 B2 | 5/2014 | Coulmeau et al. | |
| 9,193,442 B1 * | 11/2015 | Young | B64C 19/00 |
| 2009/0112454 A1 * | 4/2009 | Wachenheim | G05D 1/0676 |
| | | | 701/121 |
| 2014/0088799 A1 | 3/2014 | Tino et al. | |
| 2014/0236397 A1 * | 8/2014 | Tino | G06Q 10/047 |
| | | | 701/3 |
| 2014/0343759 A1 | 11/2014 | Garrido-Lopez et al. | |

OTHER PUBLICATIONS

European Patent Office, "Communication pursuant to Article 94(3) EPC," issued in connection with European Patent Application No. 15 382 337.2, dated Jan. 19, 2018, 6 pages.

* cited by examiner

METHOD AND SYSTEM OF CONTROLLING A FLIGHT OF AN AIRCRAFT SUBJECTED TO A REQUIRED TIME OF ARRIVAL CONSTRAINT

RELATED APPLICATION

This patent claims priority to European Patent Application No. 15382337.2, filed Jun. 26, 2015, and entitled "Method and System of Controlling a Flight of an Aircraft Subject to a Required Time of Arrival Constraint," which is hereby incorporated by reference in its entirety.

FIELD

The present disclosure relates to methods of controlling a flight of an aircraft subjected to a required time of arrival constraint at a target waypoint, and to an additional flight variable that is not the Cost Index, by modifying the Mach speed and descent speed independently. The present disclosure also relates to systems for controlling the flight of an aircraft subjected to a required time of arrival constraint and to a computer program that, when executed, carries out the example methods. Example methods of controlling the flight of the aircraft are carried out during the cruise phase or the initial part of the descent (that is flown in Mach mode) of the flight and the target waypoint lies in the descent phase of the flight. The main technical fields of the disclosure relate to air traffic control, especially in areas in which incoming air traffic may cause conflicts and subsequent safety risks, such as areas close to airports, as well as the optimization of a variety of flight parameters.

BACKGROUND

The Required Time of Arrival (RTA) function of an aircraft is activated when the pilot sets a required time of arrival at a target waypoint ahead. The RTA function then predicts a trajectory that satisfies the time constraint and modifies the flight speeds accordingly. If the flight is in cruise phase and the target waypoint is in the descent phase, a conventional RTA function does not alter current cruise speed and scheduled descent speed independently.

Cruise speed and descent speed, and more particularly cruise Mach speed and descent calibrated air speed (CAS), are the two main search variables to find trajectories that comply with the RTA constraint. However, conventional RTA functions iterate over a Cost Index (CI) of the aircraft, which couples cruise Mach and descent CAS variations. In other words, conventional RTA functions iterate over a single variable, the CI, to find the trajectory. Each CI defines a unique Mach/CAS combination, given the aircraft cruise altitude, aircraft weight, and meteorological conditions. The CI is used for the initial trajectory prediction as well as for speed corrections during the flight.

A given CI implies a balance between fuel and operational costs. For CI=0, the minimum-fuel trajectory is taken without consideration of operational costs. As the CI increases, flight speeds increase too and, consequently, fuel costs become higher while flight time is reduced.

However, using CI-coupled Mach/CAS combinations often leads to solutions that are far from desirable because the resulting descent CAS or cruise Mach may be very close (or equal) to the aircraft speed limits. In general, the RTA function requires adjusting flight speeds during the flight and, if the initially specified speeds are too close to the aircraft speed limits, the RTA may become unachievable. Further, the resulting descent CAS or cruise Mach combinations may not result in the most fuel-efficient flight.

SUMMARY

Disclosed herein is an example method of controlling a flight of an aircraft subjected to a required time of arrival (RTA) constraint at a target waypoint. The example method includes calculating combinations of cruise speed and descent speed for estimated times of arrival (ETAs) at the target waypoint and determining a subset of the combinations that introduce substantially a same amount of time change in the ETA when changing the corresponding cruise speed to a cruise speed limit as when changing the corresponding descent speed to a descent speed limit. The example method also includes selecting a combination of the subset of the combinations having an ETA corresponding to the RTA and modifying at least one of a cruise speed or a descent speed of the aircraft based on the selected combination.

Disclosed herein is an example system to control a flight of an aircraft subjected to a required time of arrival (RTA) constraint at a target waypoint. The example system includes an estimated time of arrival (ETA) determiner to calculate combinations of cruise speed and descent speed for estimated times of arrival (ETAs) at the target waypoint. The example system includes a criterion determiner to determine a subset of the combinations that introduce substantially a same amount of time change in the ETA when changing the corresponding cruise speed to a cruise speed limit as when changing the corresponding descent speed to a descent speed limit. The example system also includes a selector to select a combination of the subset of the combinations having an ETA substantially equal to the RTA and a speed profile generator to generate a signal that modifies at least one of a cruise speed or a descent speed of the aircraft based on the selected combination.

Disclosed herein is an example tangible computer readable storage medium having instructions that, when executed, cause a machine to at least calculate combinations of cruise speed and descent speed for estimated times of arrival (ETAs) at a target waypoint, determine a subset of the combinations that introduce substantially a same amount of time change in the ETA when changing the corresponding cruise speed to a cruise speed limit as when changing the corresponding descent speed to a descent speed limit, select a combination of the subset of the combinations having an ETA substantially equal to a required time of arrival (RTA) constraint and modify at least one of a cruise speed or a descent speed of the aircraft based on the selected combination.

Disclosed herein is an example method of controlling a flight of an aircraft subjected to a required time of arrival constraint. The example method includes receiving a required time of arrival (RTA) at a target waypoint, the target waypoint located in a descent phase of the flight, and calculating, during flight, a set of combinations of cruise speed and descent speed that comply with an estimated time of arrival (ETA) at the target waypoint. The cruise speed and the descent speed are calculated independently from each other. The example method includes determining a criterion to establish at least one flight parameter, determining a subset of combinations of cruise speed and descent speed from the set of combinations that complies with the criterion, selecting a combination of the subset of calculated combinations that complies with RTA=ETA and modifying the cruise speed and the descent speed of the aircraft according to the selected combination.

Disclosed herein is an example system for controlling a flight of an aircraft subjected to a required time of arrival constraint. The example system includes a Flight Management System including a trajectory generator and a speed profile generator. The Flight Management System is configured to execute instructions for receiving a required time of arrival (RTA) at a target waypoint, the target waypoint located in a descent phase of the flight, and calculating, during flight, a set of combinations of cruise speed and descent speed that comply with an estimated time of arrival (ETA) at the target waypoint. The cruise speed and the descent speed are calculated independently from each other. The Flight Management System is further configured to execute instructions for determining a criterion to establish at least one flight parameter, determining a subset of combinations of cruise speed and descent speed from the set of combinations that complies with the criterion, selecting a combination of the subset of combinations that complies with RTA=ETA and modifying a cruise speed and a descent speed of the aircraft according to the selected combination.

Disclosed herein is an example tangible computer readable storage medium having instructions that, when executed, cause a machine to at least receive a required time of arrival (RTA) at a target waypoint, where the target waypoint is located in a descent phase of the flight and calculate, during flight, a set of combinations of cruise speed and descent speed that comply with an estimated time of arrival (ETA) at the target waypoint. The cruise speed and the descent speed are calculated independently from each other. The instructions also cause the machine to determine a criterion to establish at least one flight parameter, determine a subset of combinations of cruise speed and descent speed from the set of combinations that complies with the criterion, select a combination of the subset of combinations that complies with RTA=ETA and modify a cruise speed and a descent speed of the aircraft according to the selected combination.

Figure 1:
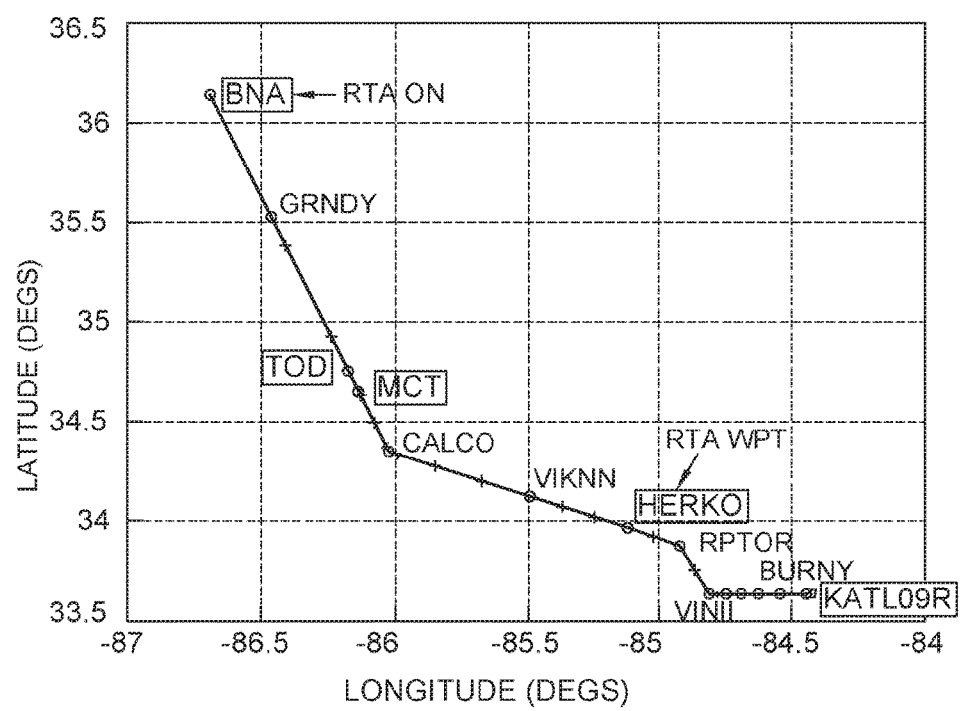
FIG. 1 illustrates an example lateral path of an aircraft of a first example flight between a point at which a pilot activates an RTA function at a waypoint until the aircraft arrives at a destination airport (Atlanta International Airport).

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness. Additionally, several examples have been described throughout this specification. Any features from any example may be included with, a replacement for, or otherwise combined with other features from other examples.

DETAILED DESCRIPTION

Example methods, apparatus/systems and articles of manufacture are disclosed herein for controlling a flight of an aircraft subjected to a required time of arrival (RTA) constraint. The example methods, apparatus/systems and articles of manufacture control the flight of the aircraft to cause the aircraft to reach a target waypoint substantially at the RTA by finding the best combination of cruise speed and descent speed of the aircraft based on different criteria.

The instant disclosure provides a method for controlling a flight of an aircraft to enable the aircraft reliably and accurately to meet the RTA. The instant disclosure provides a method to accommodate and responsively modulate speed changes in the cruise and descent phases of the flight.

Disclosed herein is an example method of controlling a flight of an aircraft subjected to a required time of arrival (RTA) constraint. The example method includes receiving an RTA at a target waypoint (WPT), where the target WPT is located in a descent phase of the flight, and calculating, during flight, a set of combinations of cruise speed and descent speed that satisfy an estimated time of arrival (ETA) at the target waypoint. The cruise speed and the descent speed are calculated independently. The example method also includes determining a criterion to establish at least one flight parameter and determining a subset of combinations of cruise speed and descent speed from the set of combinations that complies with the criterion. The example method further includes selecting a combination of the subset of combinations that complies with RTA=ETA, and modifying a cruise speed and a descent speed of the aircraft according to the selected combination.

In some examples, the criterion includes avoiding aircraft and air traffic imposed speed limits. In this manner, the aircraft maintains certain speed margins for facing unexpected situations.

In some examples, determining the subset of combinations includes determining a first set of combinations of cruise speed and descent speed, where each combination of the first set of combinations introduces a same amount of time delay when cruise speed is reduced to a minimum cruise speed as when descent speed is reduced to a minimum descent speed. In some examples, determining the subset of combinations includes determining a second set of combinations of cruise speed and descent speed, where each combination of the second set of combinations introduces a same amount of time anticipation when cruise speed is increased to a maximum cruise speed as when descent speed is increased to a maximum descent speed.

In some examples, determine the subset of combinations of cruise speed and descent speed further includes determining a third set of combinations of cruise speed and descent speed having a cruise speed that is fixed to:

$$a = \frac{\text{minimum cruise speed} + \text{maximum cruise speed}}{2}$$

and where the subset of combinations includes:
- combinations of the first set of combinations having a cruise speed $\geq a$, the combination with cruise speed=$a$ defining the minimum descent speed;
- combinations of the second set of combinations having a cruise speed $\leq a$, the combination with cruise speed=$a$ defining the maximum descent speed; and,
- combinations of the third set of combinations having a descent speed between the minimum descent speed and the maximum descent speed.

In some examples, the selection of the third set of cruise and descent speed combinations assures speed margins during the cruise phase of the flight and accelerates the transition between the combinations of the first and second sets previously calculated. In some examples, determining the set of combinations includes establishing a contour map, where each isocontour of the contour map represents a subset of cruise speed and descent speed pairs that satisfies the RTA at the target waypoint.

In some examples, the first set of combinations, the second set of combinations and the third set of combinations are represented by respective isocontours, where the intersection of the isocontours corresponds with the subset of combinations of cruise speed and descent speed.

In some examples, the criterion includes minimizing fuel consumption of the aircraft. In other examples, other criterion may be implemented. In some examples, determining the subset of combinations of cruise speed and descent speed includes calculating a fuel consumption value for each combination of the set of combinations and selecting a combination from the set of combinations having ETA=RTA and a lowest fuel consumption value.

In some examples, if the ETA value does not equal the RTA, the method includes carrying out a 2D linear interpolation with the ETA values close to the RTA to obtain the ETA=RTA with minimum fuel consumption.

In some examples, determining the set of combinations includes establishing a contour map, where each isocontour of the contour map represents a subset of cruise speed and descent speed pairs that satisfies the required time of arrival at the target waypoint. In some examples, the calculation of fuel consumption for each combination of the set of combinations is represented by isocontours. In some such examples, determining the subset of combinations includes selecting the values of cruise speed and descent speed corresponding to a tangent point between each isocontour of the combinations that satisfies the RTA at the target waypoint and the isocontours of the estimation of fuel consumption.

In some examples, the at least one flight parameter and a given flight condition include at least one of an aircraft weight, a cruise altitude, a flight plan and a weather condition.

In some examples, the method includes receiving a set of predefined or measured conditions for delimiting aircraft speed limits. In some examples, the set of predefined or measured conditions include a weight of the aircraft and a cruise altitude.

In some examples, the method includes receiving a flight plan, weather conditions and initial aircraft conditions that, together with the cruise altitude, condition the combinations of the set of combinations that comply with the ETA.

In some examples, the method dynamically and continuously executes during flight to modify an aircraft trajectory by changing the cruise speed and descent speed of the aircraft.

The present disclosure also extends to a system for controlling the flight of an aircraft subjected to a required time of arrival constraint. The example system includes a Flight Management System (FMS) (optionally a Flight Management Computer (FMC)) in communication with a trajectory generator and a speed profile generator. The FMS is configured to execute instructions to implement any of the example methods.

In some examples, the speed profile generator is configured to receive a cruise speed and descent speed combination and generate a speed profile signal in response to the cruise speed and descent speed combination. In such examples, the trajectory generator is configured to receive the speed profile signal and generate an aircraft trajectory in response to the speed profile signal so that the aircraft trajectory equals the RTA at the target WPT.

In some examples, the FMS is configured to receive a weight of the aircraft and a cruise altitude and determine speed limits of the aircraft.

In some examples, the FMS is configured to receive a flight plan, weather conditions, initial aircraft conditions and a cruise altitude and determine the set of cruise speed and descent speed combinations corresponding to the RTA.

Further, the present disclosure also extends to a computer program including program code which, when executed, carries out any of the example methods and/or implements any of the example apparatus/systems.

The present disclosure also extends to an aircraft arranged to implement any of the example methods and to an aircraft including any of the example systems.

Further, the disclosed example methods may be adapted to be effective when applied to different aircraft control systems that may rely on a variety of method for adjusting flight speed.

The example methods, apparatus/systems and articles of manufacture remove limitations to the RTA function for cruise-descent trajectories. Known methods rely on a one-dimensional search of Mach/CAS combinations coupled by Cost Index (CI), while the examples disclosed herein generalize the search to two dimensions: Mach and CAS, which are calculated independently. Once that generalization is adopted, different optimization criteria is then be applied to narrow the Mach/CAS search. In some examples, the final combination does not correspond to a CI-coupled combination but, instead, corresponds to a combination that optimizes an additional flight parameter that may be a better solution than the CI-coupled combination.

To describe the following examples of the disclosure, a first example flight with the following conditions is taken:
  Wide-body commercial aircraft;
  Initial conditions: cruising at an altitude of 35000 ft., at maximum landing weight (MLW);
  Atmospheric conditions: No winds and standard atmosphere.

FIG. 1 shows a lateral path of the first example flight on a standard arrival to runway 9 of the Atlanta International Airport (KATL09R). The initial point at which an RTA function of the aircraft is activated for this particular example is BNA (e.g., a navigation aid close to Nashville, Tenn.) which is about 205 nautical miles (NM) away from the runway in along-track distance. At this initial point, the pilot sets an RTA at a target waypoint over HERKO, which is about 45 NM away from the runway in along-track distance. Other example intermediate waypoints (GRNDY, CALCO, VIKNN, RPTOR, VINII, BURNY) are shown in FIG. 1. Also, a "Top of Descent" (TOD) point and a "Mach to CAS Transition" (MCT) point are shown.

Figure 2:
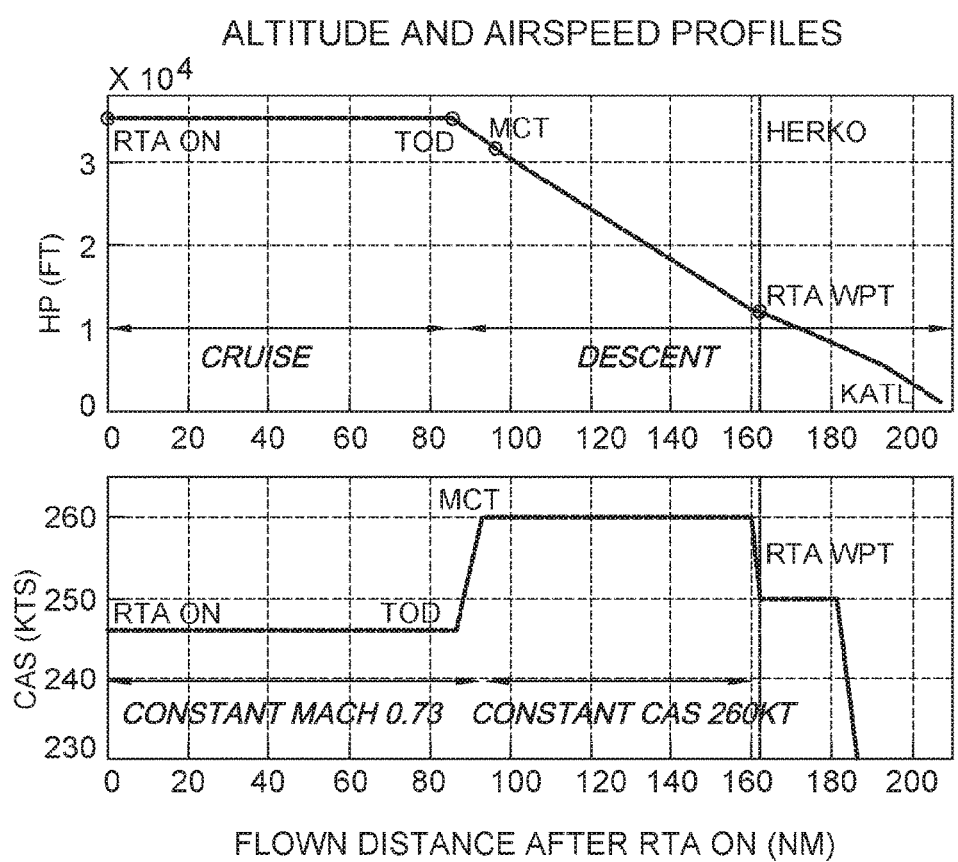
FIG. 2 illustrates an example pressure altitude graph (top graph) and an example calibrated airspeed (CAS) graph (bottom graph) of a predicted trajectory of the first example flight of FIG. 1, as a function of flown distance, starting from the point where the RTA function is activated by the pilot.

FIG. 2 shows an example pressure altitude graph (top graph) and a Calibrate Airspeed (CAS) graph (bottom graph) for the first example flight of FIG. 1, as a function of the along-track distance from the initial point BNA at which the RTA function has been activated. The pressure altitude graph shows a cruise phase of approximately 85 NM, and a descent phase of 120 NM for this particular example. The RTA waypoint (RTA WPT) at HERKO is well into the descent phase, with a predicted altitude close to 10000 feet (ft).

The CAS graph describes the flight of the aircraft with a constant cruise Mach (0.73) from BNA to TOD, a constant descent Mach (260 knots (KT)) from TOD to the MCT and a constant descent CAS from the MCT to the HERKO (260 KT).

Figure 3:
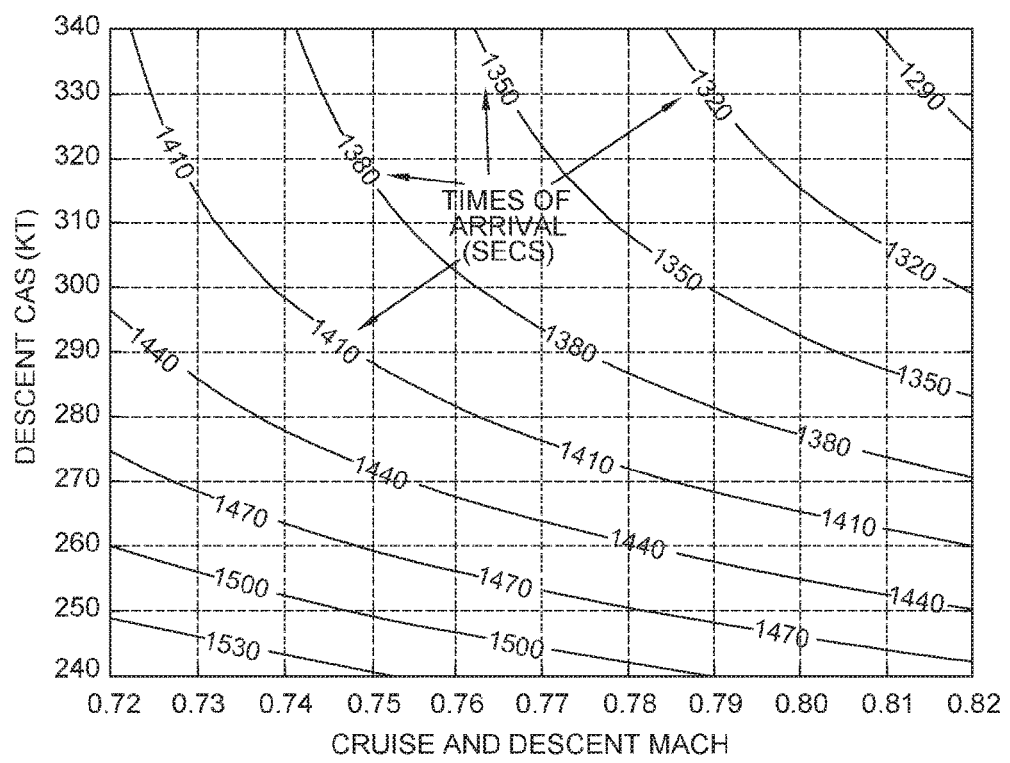
FIG. 3 illustrates an example contour map or isocontours graph of estimated arrival times for an RTA at a target waypoint for the first example flight of FIGS. 1 and 2, as a function of descent CAS and cruise and descent Mach. Arrival times (in seconds) are relative to the instant when the RTA function is activated by the pilot.

In a particular example of the disclosure, and for the first example flight of FIGS. 1 and 2, a contour map of achievable times of arrival at the target waypoint as a function of cruise/descent Mach and descent CAS, is calculated, as shown in FIG. 3. The t=0 reference represents the moment when pilot activates the RTA function at BNA" The estimated arrival times (ETAs) are represented by solid lines of constant time. The boundaries of this graph are the Mach and CAS speed limits of this particular flight example. In this example, the RTA function never programs CAS speeds below 240 KT or above 340 KT, and never programs Mach speeds below 0.72 or above 0.82. In some examples, the speed limits of the aircraft depend on a weight of the aircraft and/or a flight or cruise altitude (e.g., cruise level 35000 ft. and weight 144000 lbs.). In other examples, the speed limits may be based on other constraints (e.g., aircraft in front and/or behind the aircraft). According to FIG. 3, the earliest time of arrival that can be achieved by the aircraft for this particular example flight is approximately 1280 seconds (i.e., reaching the RTA waypoint 21 minutes and 20 seconds past initial time) flying at Mach=0.82 and CAS=340 KT. The latest time of arrival that can be achieved is 1560 seconds (i.e., reaching the target RTA waypoint 26 minutes past initial time) flying at Mach=0.72 and CAS=240 KT.

Figure 4:
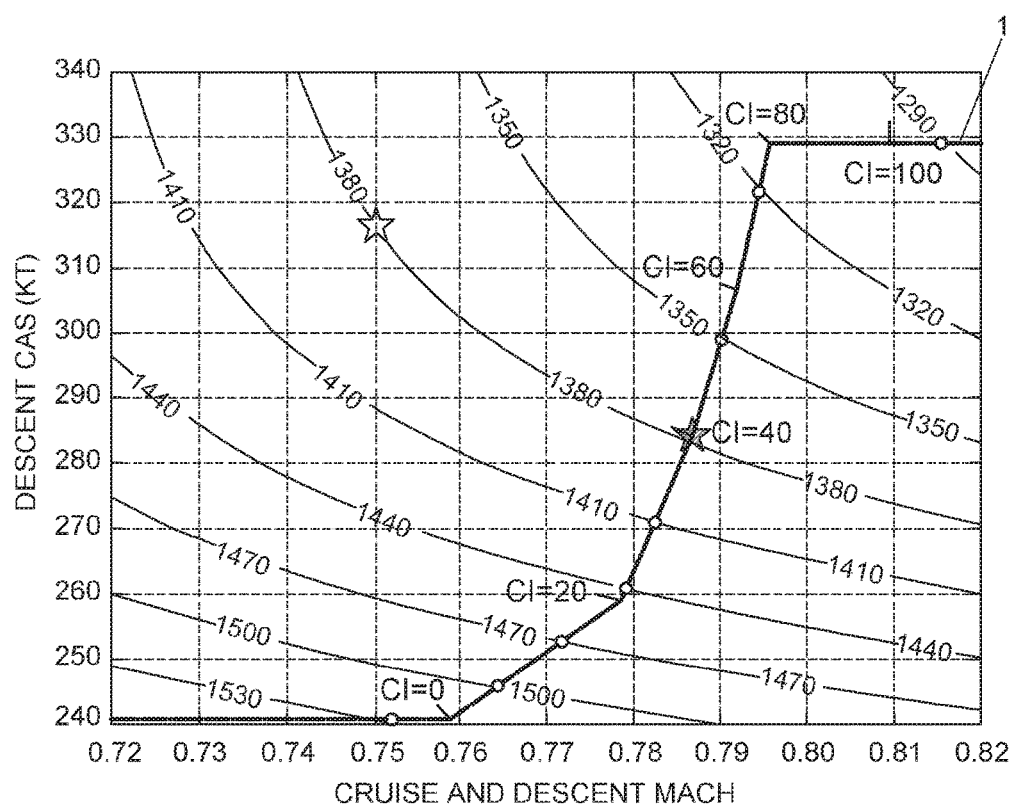
FIG. 4 illustrates the example isocontours graph of FIG. 3 including an example Cost Index (CI) curve (dash-dot line) of example CI values for the first example flight.

FIG. 4 shows the possible cruise Mach/descent CAS combinations as a function of Cost Index (CI) for the first example flight. The dash-dot line (1) superposed to the contour map corresponds to the CI values. Current Flight Management Systems (FMS), and more particularly Flight Management Computers (FMC), iterate over CI (1) to find the Mach/CAS combination that satisfies a given RTA. For example, if the pilot enters an RTA=initial time+23 min (1380 seconds), the FMS finds the trajectory corresponding to the intersection of RTA=1380s (solid line tagged with 1380) and the dash-dot line corresponding to the CI values. As illustrated in FIG. 4, the resulting CI is approximately 40, and the speeds that correspond to the mentioned RTA are M=0.786 and CAS=284 KT (represented by a dark star in FIG. 4). As illustrated in the example of FIG. 4, many different Mach/CAS combinations lead to a trajectory satisfying the RTA=1380s other than the CI-coupled combination. All these combinations are represented by the solid contour line t=1380s. For instance, the Mach=0.75 and CAS=316 KT trajectory also satisfies the RTA=1380s (e.g., which includes a relatively slower cruise and a relatively faster descent, labeled with a hollow star in FIG. 4). In some situations, this alternative may be a better solution under certain conditions. For example, in a situation where another flight is ahead of the aircraft during cruise, the aircraft speed cannot go beyond Mach=0.76 to avoid a conflict between the two flights. Considering an RTA=1380s and the traffic-imposed speed limit, a conventional FMS using CI would find the RTA unachievable because the only possible combination would be Mach=0.786 and CAS=284 KT. Therefore, the existing solutions, which make use of CI to obtain coupled Mach/CAS speed combinations for a given RTA, do not account for other conditions or criteria that do not directly depend on the hourly or fuel consumption of the aircraft and, thus, which do not directly depend on CI.

FIGS. 5-8 illustrate several example methods of controlling a flight of an aircraft under a required time of arrival constraint related to the first example flight previously described and related to a second example flight detailed below. These examples are focused on finding the best Mach/CAS combinations according to different flight criteria.

Figure 5:
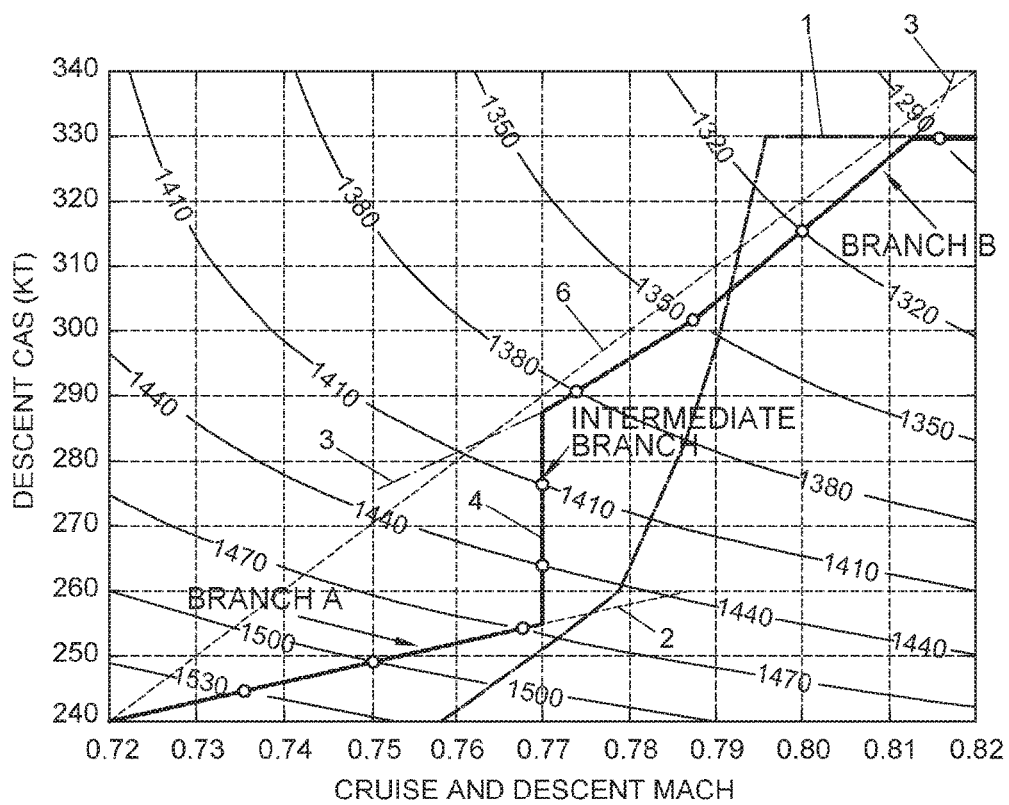
FIG. 5 illustrates the example isocontours graph of FIG. 4 including an example Mach/CAS speed curve (thick dashed line) of Mach/CAS speed combinations that maximize the likelihood of RTA success and generated in accordance with the teachings of this disclosure.

FIG. 5 discloses a first particular example of the method of the present disclosure where the selected criterion maximizes the likelihood that the operation is successful by avoiding flight speed limits. In other words, the criterion that conditions the selected Mach/CAS combination is that the Mach/CAS combination avoids the Mach and CAS values at or close to the aircraft speed limits. This particular example of the method refers to the first example flight described in FIGS. 1-4.

The CI-coupled Mach/CAS solutions suffer from an important drawback. When later times of arrival are required, the descent CAS may be very close to, or equal to, the minimum acceptable CAS. For this flight example, FIG. 4 shows that for RTA equal or greater than 1520 seconds, a conventional FMS finds a CI-coupled solution with minimum CAS (CAS_min)=240 KT and cruise Mach decreasing from 0.76 to 0.72 as the RTA increases. The problem with these solutions is that while the aircraft descends at CAS_min, the aircraft is not able to reduce its speed if, for instance, the aircraft experiences stronger-than-expected tailwinds. In such a situation, the RTA becomes unachievable. The problem likewise occurs for very early required times of arrival. For RTA equal to or lower than 1315 seconds, CAS is equal to the maximum CAS (CAS_max)= 330 KT. If for some unexpected reason the aircraft is running late (e.g., behind schedule), the aircraft is not able to increase CAS and, thus, the RTA becomes unachievable.

The example methods, apparatus/systems and articles of manufacture disclosed herein maximize the likelihood of a successful operation by enabling the Mach/CAS combinations to vary along a different curve than that defined by Cost Index. There can be a variety of alternative curves that achieve this.

FIG. 5 illustrates an example method of calculating the map of possible arrival times within the speed limits and under the given conditions (e.g., initial position, weight, and/or meteorological prediction), which is represented by the solid lines. In FIG. 5, a total of 121 conditions (11 cruise Mach×11 descent CAS) were used. The CI-coupled Mach/CAS combinations (1) are also shown.

For the larger values of RTA, the method calculates the Mach/CAS combinations that permit the same amount of time delay when the Mach is reduced to the minimum Mach (Mach_min) as when the CAS is reduced to CAS_min, see Branch A (2). In this manner, the aircraft is able to reduce time anticipations during cruise and during descent in the same measure. For example, for RTA=1500s (Mach=0.75, CAS=250 KT) the aircraft can initially delay the estimated arrival by 30 seconds when reducing cruise speed to M=0.72 as well as when reducing descent speed to CAS=240 KT.

For the earliest achievable RTAs, the method calculates the Mach/CAS combinations that permit the same amount of time anticipation by increasing the Mach to the maximum Mach (Mach_max) as by increasing the descent CAS to CAS_max, see Branch B (3). In this manner, the aircraft is able to acquire delays during the flight that can be mitigated during cruise as well as during descent in similar measure.

In some examples, Branches A (2) and B (3) do not intersect. Therefore, in some examples, an intermediate branch that links the Branches A (2) and B (3) is chosen. Then, a constant Mach Intermediate Branch (4) is selected, which allows the same margins of Mach reduction and accelerations during cruise. In other examples, other alternatives for choosing the Intermediate Branch (4) may be selected.

Once the complete curve (thick dashed line) that defines the Mach/CAS combinations is obtained, the method iterates over these Mach/CAS values until the estimated time of arrival (ETA) matches the required RTA.

In other examples, other curves (Mach/CAS combinations) that lead to Mach/CAS combinations with generous margins with respect to their corresponding maximum and minimum speed limits can be found. An example is the diagonal (6) illustrated in FIG. 5, from (Mach_min, CAS_min) to (Mach_max, CAS_max). The Mach/CAS combinations given by the diagonal (6) have margins with respect to the speed envelopes for all RTAs. However, in some examples, the capability of delaying the arrival during cruise and descent may not be well balanced. For instance, for RTA=1440 seconds, the solution is Mach=0.75 and CAS=270 KT. If the cruise Mach is reduced to 0.72 the predicted arrival time is increased by approximately 40 seconds. In contrast, if descent CAS is reduced to 240 KT, the predicted arrival time is increased by almost 100 seconds. A greater margin of corrections during cruise would be desirable at the expense of reducing the generous margin during descent.

The example method can also be extended to instances where more restrictive speed limits apply to the operation. In such instances, the X-axis and Y-axis ranges of the diagram change according to the different speed limits. In some examples, the different branches are recalculated when these one or more of these conditions change.

The example method can also be applied during the RTA operation. When the ETA differs beyond a certain threshold from the RTA, the RTA function seeks a new trajectory that satisfies the RTA. In some examples, a new contour map of arrival times is calculated (e.g., at that moment) and a new curve of maximum likelihood of RTA success is obtained, which can be used to derive the new Mach/CAS combination.

Figure 6:
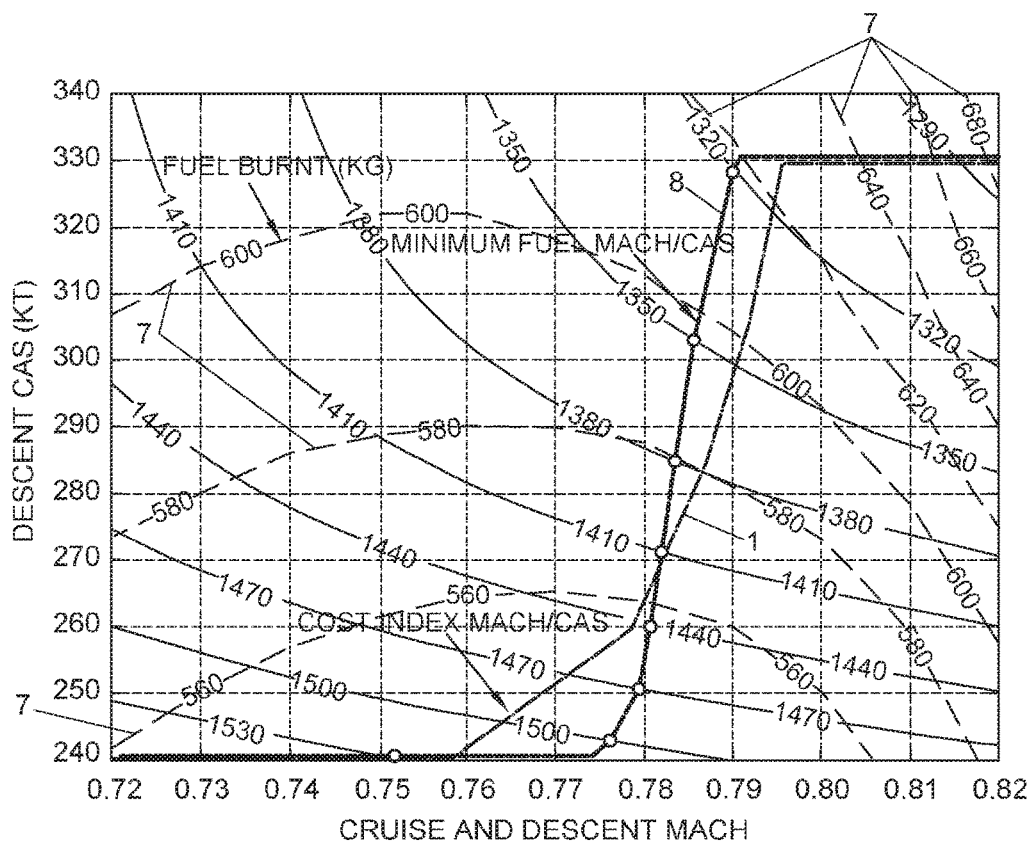
FIG. 6 illustrates the example isocontours graph of FIG. 4 including example isocontours (thin dashed lines) of fuel consumption during the RTA operation (kg) and an example Mach/CAS curve (thickest dashed line) of Mach/CAS combinations that result in a minimum fuel consumption for each given time of arrival and generated in accordance with the teachings of this disclosure.

FIG. 6 illustrates another example method of the present disclosure where the selected flight criterion minimizes fuel consumption during a flight operation. This particular example of the method refers to the first example flight described in FIGS. 1 to 4.

After estimating arrival times for each Mach/CAS, similar to the example method disclosed in connection with FIG. 5 above, the fuel consumption for all Mach/CAS values is estimated. FIG. 6 shows the contour lines of fuel consumption (thin dashed lines) (7) together with the contour lines of estimated arrival times (thin solid lines).

In the illustrated example of FIG. 6, the points where the time contour lines are tangent to the fuel consumption lines define the Mach/CAS pairs that lead to the most fuel-efficient flight for each arrival time. As can be seen in FIG. 6, the resulting curve (8) does not coincide with the CI-coupled curve (1). Therefore, when the most efficient flight solution is searched, the CI curve (1) should be disregarded. Next, the example method includes finding the collection of Mach/CAS values that define the minimum fuel consumption for each arrival time.

Once all these points are found, the resulting curve (8) is iterated to find the Mach/CAS value for which the estimated arrival time is equal to the RTA. The CI-coupled Mach/CAS curve and the most fuel-efficient Mach/CAS curve change when flight conditions are different.

Figure 7:
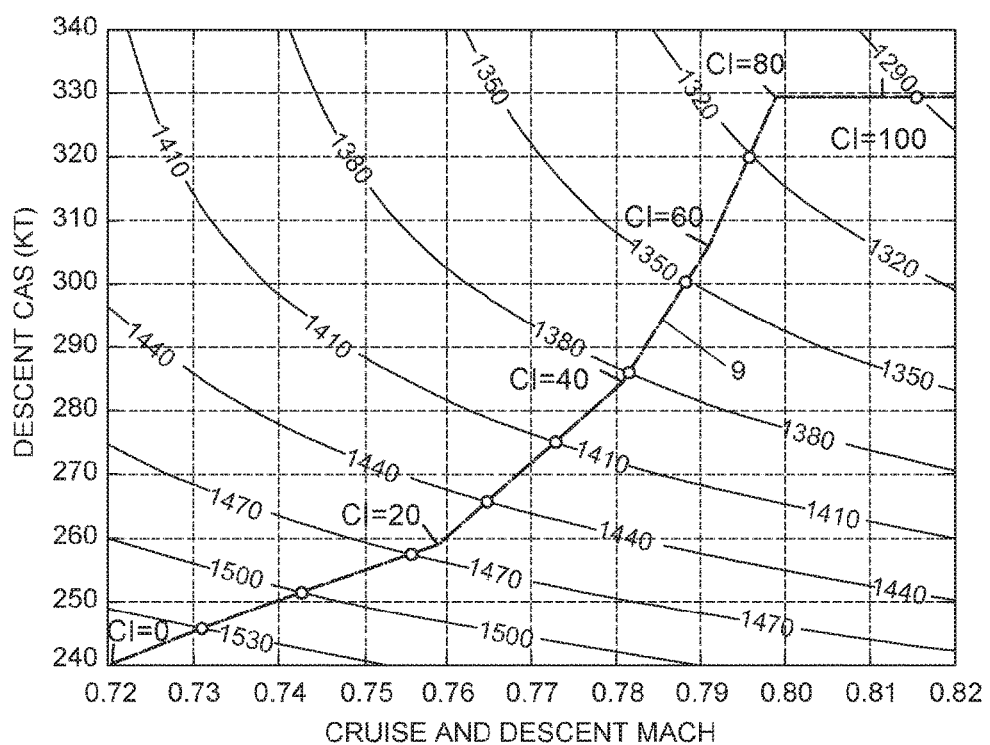
FIG. 7 illustrates an example isocontours graph of estimated arrival times for an RTA at a target waypoint and Mach/CAS combinations as a function of CI (dash-dot line) for a second example flight. The second example flight corresponds to an aircraft with an initial weight about 13% lighter than the aircraft of the first example flight of FIGS. 1-6.

FIG. 7 illustrates an example map showing a CI-coupled Mach/CAS curve (9) for a second example flight. The second example flight includes the following conditions: wide-body commercial aircraft; cruising at an altitude of 35000 ft; maximum landing weight=86% MLW (14% of reduction with respect to the first flight example); and atmospheric conditions: no winds, and standard atmosphere.

The map of FIG. 7 illustrates possible arrival times (solid lines) within the speed limits and under the given conditions (e.g., initial position, aircraft weight, meteorological prediction, etc.). Comparing CI curve (1) in FIG. 4 (the first example flight) with CI curve (9) in FIG. 7, it is obvious that there are significant changes.

Figure 8:
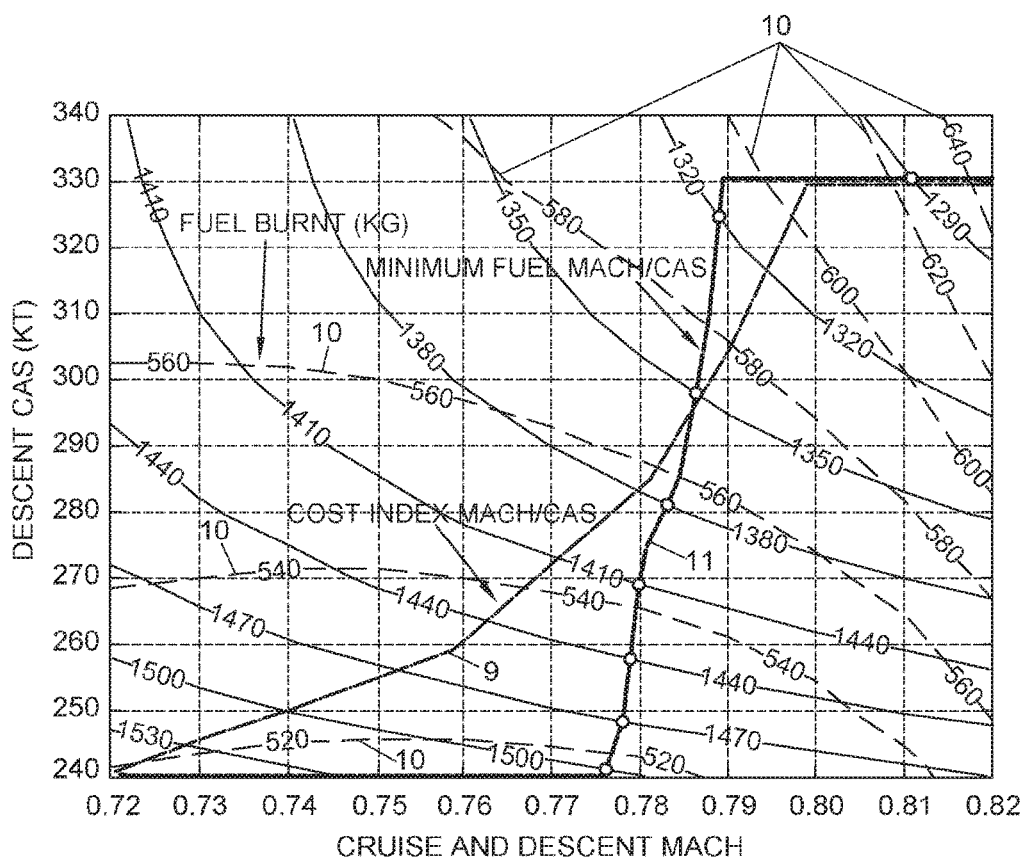
FIG. 8 illustrates the example isocontours graph of FIG. 7 including example isocontours (thin dashed lines) of fuel consumption during the RTA operation (kg) and an example Mach/CAS curve (thickest dashed line) of Mach/CAS combinations that result in a minimum fuel consumption for each given time of arrival and generated in accordance with the teachings of this disclosure.

FIG. 8 illustrates another example method of the present disclosure where the selected flight criterion minimizes fuel consumption during flight. This particular example of the method refers to the second example flight described in connection with FIG. 7. It shows the contour lines of fuel consumption (thin dashed lines) (10) together with the contour lines of estimated time of arrival (thin solid lines).

In the illustrated example of FIG. 8, the points where the estimated time of arrival contour lines are tangent to the fuel consumption contour lines define the Mach/CAS pairs that lead to the most fuel-efficient flight for each estimated time of arrival. Again, the resulting curve (11) does not coincide with the CI-coupled curve (9). Then, the ollection of Mach/CAS values that define the minimum fuel consumption for each estimated time of arrival is found and the resulting curve (11) is iterated to find the Mach/CAS value for which the estimated time of arrival is equal to the RTA.

The variation in the aircraft weight of the second example flight relative to the first example flight does not provoke important changes in the most fuel-efficient Mach/CAS curves (8, 10) shown in FIGS. 6 and 8 respectively. The example method can be applied for the speed recalculations during the RTA operation just as described for the first example flight above.

Additionally or alternatively, in some examples other flight criteria are considered. For instance, in another example method of the present disclosure a selected criterion may be considered that includes obtaining an optimal reference trajectory of the aircraft for general purposes. Other flight criterion may be avoiding vertical flight constraints, e.g., avoiding aircraft speed limits applied to aircraft vertical path (e.g., because the vertical path of a descent operation changes when the cruise and descent speeds are modified by the RTA). This flight criterion forces the resulting vertical profile above a given waypoint to be as high as possible to avoid an AT/ABOVE vertical constraint and have generous margin of altitude should the aircraft need to change its vertical path when updating the RTA speed during the RTA operation Conversely, the resulting vertical profile is as low as possible to avoid an AT/BELOW vertical constraint and have a generous margin of altitude should the aircraft need to change its vertical path when updating the RTA speed during the RTA operation.

Figure 9:
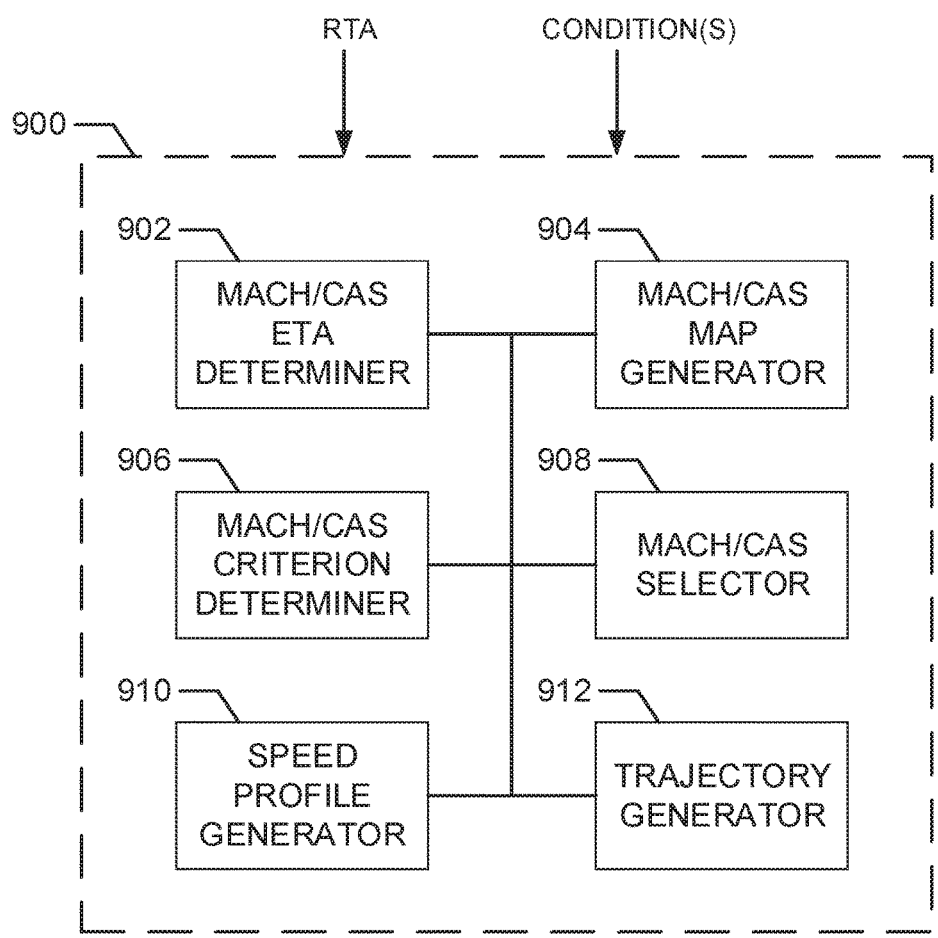
FIG. 9 illustrates an example Flight Management System for controlling an aircraft and implementing the examples disclosed in FIGS. 1-8.

FIG. 9 illustrates an example Flight Management System (FMS) 900 (e.g., a flight management computer) for implementing the example methods disclosed herein in connection with FIGS. 1-8. The FMS 900 includes a Mach/CAS ETA determiner 902 that determines a plurality of combinations of Mach and CAS for a plurality of ETA times. The Mach/CAS combinations and ETA measurements may be based on one or more conditions, such as a weight of the aircraft, a cruise altitude, a flight plan, a weather condition, an initial condition, etc. In some examples, a Mach/CAS map generator 904 generates a map of the combinations, such as the map illustrated in FIG. 3.

In the illustrated example, the FMS 900 includes a Mach/CAS criterion determiner 906. The Mach/CAS criterion determiner 906 determines one or more Mach and CAS combinations that satisfy a criterion. An example criterion may be avoiding an aircraft speed limit and/or an air traffic imposed speed limit, such as disclosed in connection with FIG. 5. The criterion curve of FIG. 5 (including Branch A, the Intermediate Branch, and Branch B) represents combinations of the Mach and CAS that comply with the criterion. Another example criterion may be minimizing fuel consumption, as disclosed in connections with FIGS. 6 and 8. In some examples, the Mach/CAS map generator 904 plots the combinations of the criterion as determined by the Mach/CAS criterion determiner 906, such as illustrated in FIGS. 5, 6 and 8.

Depending on an RTA received by the FMS 900, a Mach/CAS selector 908 selects a Mach and CAS combination having an ETA that satisfies (e.g., complies with) the criterion and the RTA. In some examples, a speed profile generator 910 generates a speed profile signal that modifies at least one of a cruise speed or a descent speed of the aircraft based on the selected Mach/CAS combination. In some examples, a trajectory generator 912 receives the speed profile signal and generates an aircraft trajectory in response to the speed profile signal, such that the aircraft trajectory meets the RTA at the target waypoint.

While an example manner of implementing the FMS 900 is illustrated in FIG. 9, one or more of the elements, processes and/or devices illustrated in FIG. 9 may be combined, divided, re-arranged, omitted, eliminated and/or implemented in any other way. Further, the example Mach/CAS ETA determiner 902, the example Mach/CAS map generator 904, the example Mach/CAS criterion determiner 906, the example Mach/CAS selector 908, the example speed profile generator 910, the example trajectory generator 912 and/or, more generally, the example FMS 900 of FIG. 9 may be implemented by hardware, software, firmware and/or any combination of hardware, software and/or firmware. Thus, for example, any of the example Mach/CAS ETA determiner 902, the example Mach/CAS map generator 904, the example Mach/CAS criterion determiner 906, the example Mach/CAS selector 908, the example speed profile generator 910, the example trajectory generator 912 and/or, more generally, the example FMS 900 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example Mach/CAS ETA determiner 902, the example Mach/CAS map generator 904, the example Mach/CAS criterion determiner 906, the example Mach/CAS selector 908, the example speed profile generator 910, and/or the example trajectory generator 912 is/are hereby expressly defined to include a tangible computer readable storage device or storage disk such as a memory, a digital versatile disk (DVD), a compact disk (CD), a Blu-ray disk, etc. storing the software and/or firmware. Further still, the example FMS 900 of FIG. 9 may include one or more elements, processes and/or devices in addition to, or instead of, those illustrated in FIG. 9, and/or may include more than one of any or all of the illustrated elements, processes and devices.

Figure 10:
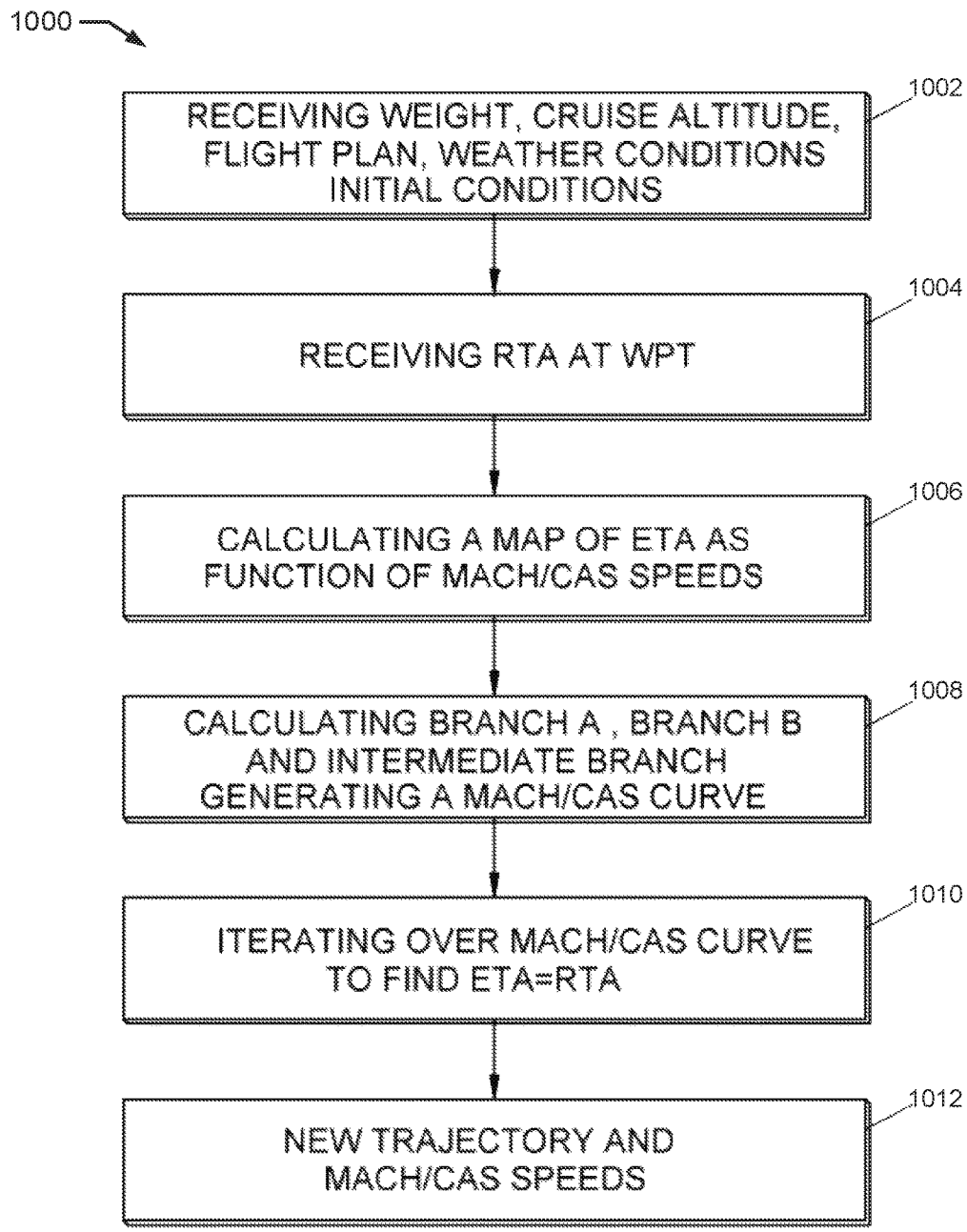
FIG. 10 is a flowchart representative of an example method to determine the best RTA-constrained trajectories that avoid aircraft speed limits and implemented by the example Flight Management System of FIG. 9.
Figure 11:
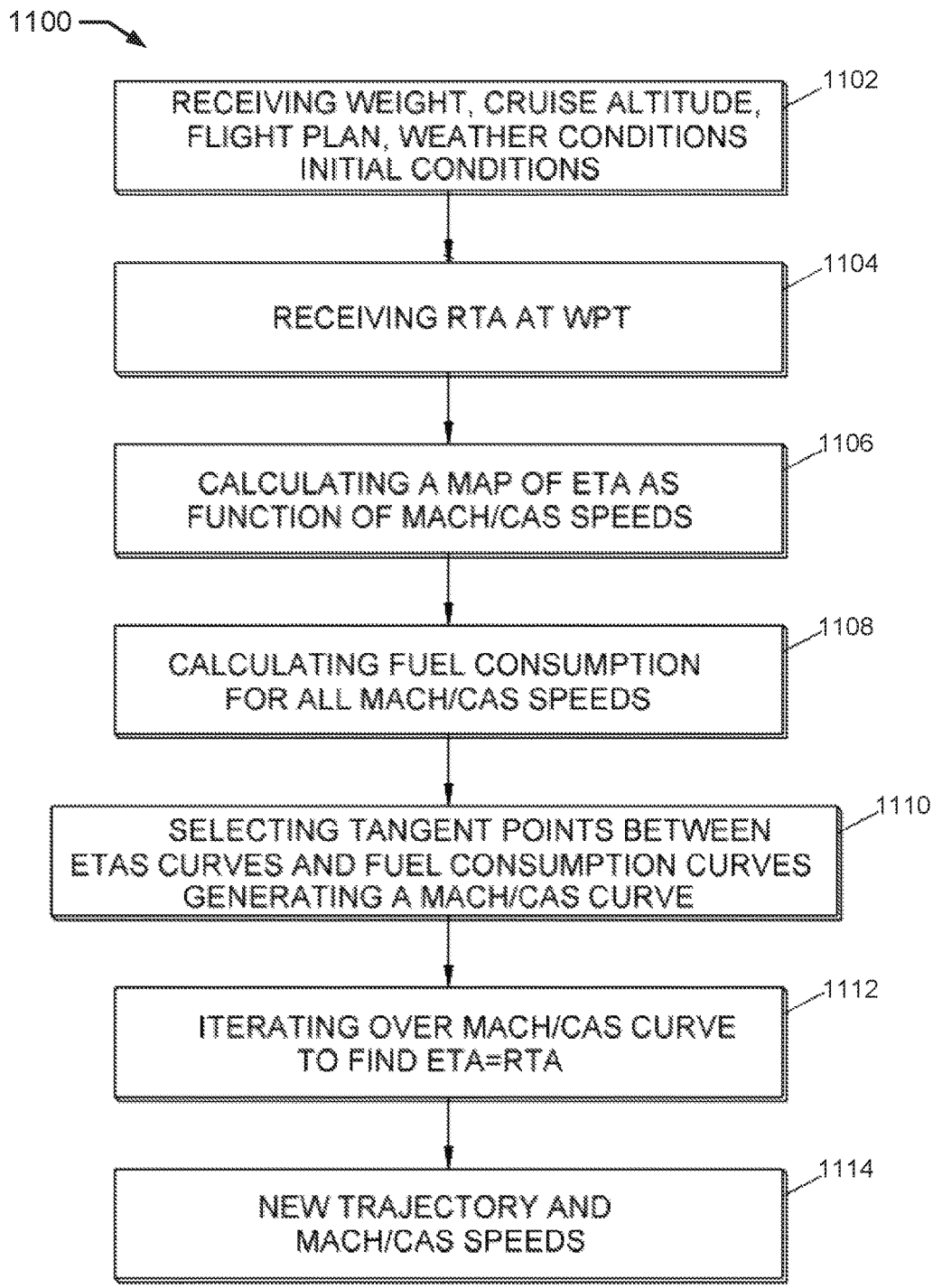
FIG. 11 is a flowchart representative of an example method to determine an RTA-constrained trajectory with least estimated fuel consumption and implemented by the example Flight Management System of FIG. 9.

Flowcharts representative of example methods for implementing the FMS 900 of FIG. 9 are shown in FIGS. 10 and 11. In these examples, the methods may be implemented by machine readable instructions that comprise a program for execution by a processor such as the processor 1212 shown in the example processor platform 1200 discussed below in connection with FIG. 12. The program may be embodied in software stored on a tangible computer readable storage medium such as a CD-ROM, a floppy disk, a hard drive, a digital versatile disk (DVD), a Blu-ray disk, or a memory associated with the processor 1212, but the entire program and/or parts thereof could alternatively be executed by a device other than the processor 1212 and/or embodied in firmware or dedicated hardware. Further, although the example program is described with reference to the flowcharts illustrated in FIGS. 10 and 11, many other methods of implementing the example FMS 900 may alternatively be used. For example, the order of execution of the blocks may be changed, and/or some of the blocks described may be changed, eliminated, or combined.

As mentioned above, the example methods of FIGS. 10 and 11 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example methods of FIGS. 10 and 11 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 10 is a flowchart illustrating an example method 1000 to implement the example FMS 900 of FIG. 9 to determine a Mach/CAS combination based on a criterion and an RTA. The example method 1000 is disclosed in connection with the example in FIG. 5. At block 1002, the example FMS 900 receives one or more conditions (e.g., a set of given conditions). The condition(s) may include, for example, a weight of the aircraft, a cruise altitude of the aircraft, a flight plan, an initial position and/or a weather condition. In some examples, the condition(s) are received at the time at which the RTA function is activated.

At block 1004, the FMS 900 receives an RTA at a target waypoint (WPT) ahead (e.g., in the descent phase of the flight trajectory). At block 1006, the Mach/CAS ETA determiner 902 calculates a set of Mach/CAS combinations for a plurality of ETAs at the WPT. In some examples, the Mach/CAS combinations are calculated within Mach and CAS speed limits and/or based on the given condition(s). In some examples, the Mach speed limit includes a minimum Mach speed a maximum Mach speed and the CAS speed limit includes a minimum CAS speed and a maximum CAS speed. In some examples, the speed limits are based on an altitude of the aircraft during cruise and/or a weight of the aircraft. In some examples, the speed limits are based on aircraft traffic (e.g., an aircraft spacing requirement). In some examples, the Mach/CAS map generator 904 creates a map of the ETAs as a function of the Mach/CAS combinations such as, for example, as illustrated in FIG. 3.

At block 1008, the Mach/CAS criterion determiner 906 determines a plurality of Mach/CAS combinations that satisfy a criterion. In the illustrated example of FIG. 5, for example, the criterion is avoiding an aircraft or an air traffic imposed speed limit. In such an example, the Mach/CAS criterion determiner 906 determiners a subset of Mach/CAS combinations that introduce a same or substantially a same amount of time change (e.g., ±2%) in the ETA when changing the corresponding Mach speed to a Mach speed limit (e.g., the Mach maximum or the Mach minimum) as when changing the corresponding CAS speed to a CAS speed limit (e.g., the CAS maximum or the CAS minimum). For example, in connection with FIG. 5, the Mach/CAS criterion determiner 906 calculates a first branch for the larger values of ETA (e.g., the Branch A (2)), a second branch for the earliest achievable RTAs (e.g., the Branch B (3)) and an intermediate branch (e.g., the Intermediate Branch). In FIG. 5, for example, the Branch A is calculated for the larger values of ETA by obtaining the Mach/CAS combinations that permit the same amount of time delay when the Mach is reduced to its minimum limit as when the CAS is reduced to its minimum limit. The Branch B is calculated for the earliest achievable RTAs by obtaining the Mach/CAS combinations that permit the same amount of time anticipation by increasing the Mach to its maximum limit, as by increasing the descent CAS to its maximum limit. In FIG. 5, the Intermediate Branch intersects branch A and branch B. The intersection generates a single Mach/CAS curve.

At block 1010, the Mach/CAS criterion determiner 906 iterates over the generated Mach/CAS curve to find the cruise Mach and descent CAS combination that meets ETA=RTA. In some examples, multiple Mach/CAS combinations may exist that comply with the criterion and the RTA. At block 1012, the Mach/CAS selector 908 selects a cruise Mach and descent CAS combination having an ETA equal or substantially equal (e.g., ±2% of the total time) to the RTA and establishes a new reference trajectory. In some examples, the speed profile generator 910 generates a speed profile signal to modify the cruise Mach and/or the descent CAS of the aircraft based on the selected Mach/CAS combination. In some examples, the FMS 900 continuously or repeatedly implements the example method 1000 (e.g., based on the changing conditions). In some examples, the method 1000 of FIG. 10 provides the best solution to find the best RTA-constrained trajectories that avoid aircraft speed limits.

FIG. 11 is another flowchart illustrating an example method 1100 to implement the example FMS 900 to determine a Mach/CAS combination based on a criterion and an RTA. The example method 1100 is disclosed in connection with FIGS. 6 and 8. At block 1102, the system 900 receives one or more conditions (e.g., a set of given conditions). The condition(s) may include, for example, a weight of the aircraft, a cruise altitude, a flight plan, a weather condition and/or an initial condition. In some examples, the condition(s) are received at the time at which the RTA function is activated.

At block 1104 the FMS 900 receives an RTA at a target waypoint (WPT) ahead (e.g., in the descent phase of the flight trajectory). At block 1106, the Mach/CAS ETA determiner 902 calculates a set of Mach/CAS combinations for a plurality of ETAs at the WPT. In some examples, the Mach/CAS combinations are calculated within Mach and CAS speed limits and/or based on the given condition(s). In some examples, the Mach speed limit includes a minimum Mach speed a maximum Mach speed and the CAS speed limit includes a minimum CAS speed and a maximum CAS speed. In some examples, the speed limits are based on an altitude of the aircraft during cruise and/or a weight of the aircraft. In some examples, the Mach/CAS map generator 904 creates a map of the ETAs as a function of the Mach/

CAS combinations such as, for example, as illustrated in FIG. 3. The ETAs are represented by isocontours in the map.

At block 1108, the Mach/CAS ETA determiner 902 calculates the fuel consumption for all Mach/CAS values of the map, and for the given condition(s). The fuel consumption values are represented by isocontours (e.g., the fuel consumption lines (7) or (10)) in the map in FIGS. 6 and 8, for example.

At block 1110, the Mach/CAS criterion determiner 906 determines or selects Mach/CAS combinations having a value that corresponds with tangent points between the ETA isocontours and the fuel consumption isocontours and generates a Mach/CAS curve. In the illustrated example of FIG. 6, for example, the curve (8) represents the Mach/CAS combinations that satisfy the minimum fuel requirement based on the corresponding ETAs.

At block 1112, the Mach/CAS criterion determiner 906 iterates over the generated Mach/CAS curve to find the cruise Mach and descent CAS combination that meets ETA=RTA. In some examples, multiple Mach/CAS combinations may exist that comply with the criterion and the RTA. At block 1114, the Mach/CAS selector 908 selects the cruise Mach and descent CAS and establishes a new reference trajectory. In some examples, the speed profile generator 910 generates a speed profile signal to modify the cruise Mach and/or the descent CAS of the aircraft based on the selected Mach/CAS combination. In some examples, the FMS 900 continuously or repeatedly implements the example method 1000 (e.g., based on the changing conditions). In some examples, the method 1100 of FIG. 11 provides the best solution to minimizing fuel consumption during the flight operation.

As illustrated in the disclosed examples, the uncoupling of Mach and CAS to find time-constrained trajectories opens up many possibilities that were discarded with the traditional CI-coupled calculation. The example methods find optimal trajectories subject to a time constraint at a target waypoint. This reference trajectory can then be used by an RTA function, but can also be used as a reference trajectory for a different guidance method such as a 4D guidance reference method.

Example methods disclosed herein may be implemented by a computer (e.g., disclosed in connection with FIG. 12) programmed to operate in accordance with the example methods. The computer may be air-based or land-based. For example, an air-based computer may be associated with an aircraft's flight management system that controls the aircraft on the basis of a calculated optimum maximum range cruise speed. In another example, a land-based computer system may be located at an air traffic control facility or a mission planning facility for use in ground based trajectory prediction or simulation. The computer may include a processor and a memory for a computer program that, when executed, causes the processor to operate in accordance with the methods described herein. The computer program may also be embodied in a computer readable medium having stored therein the computer program.

Figure 12:
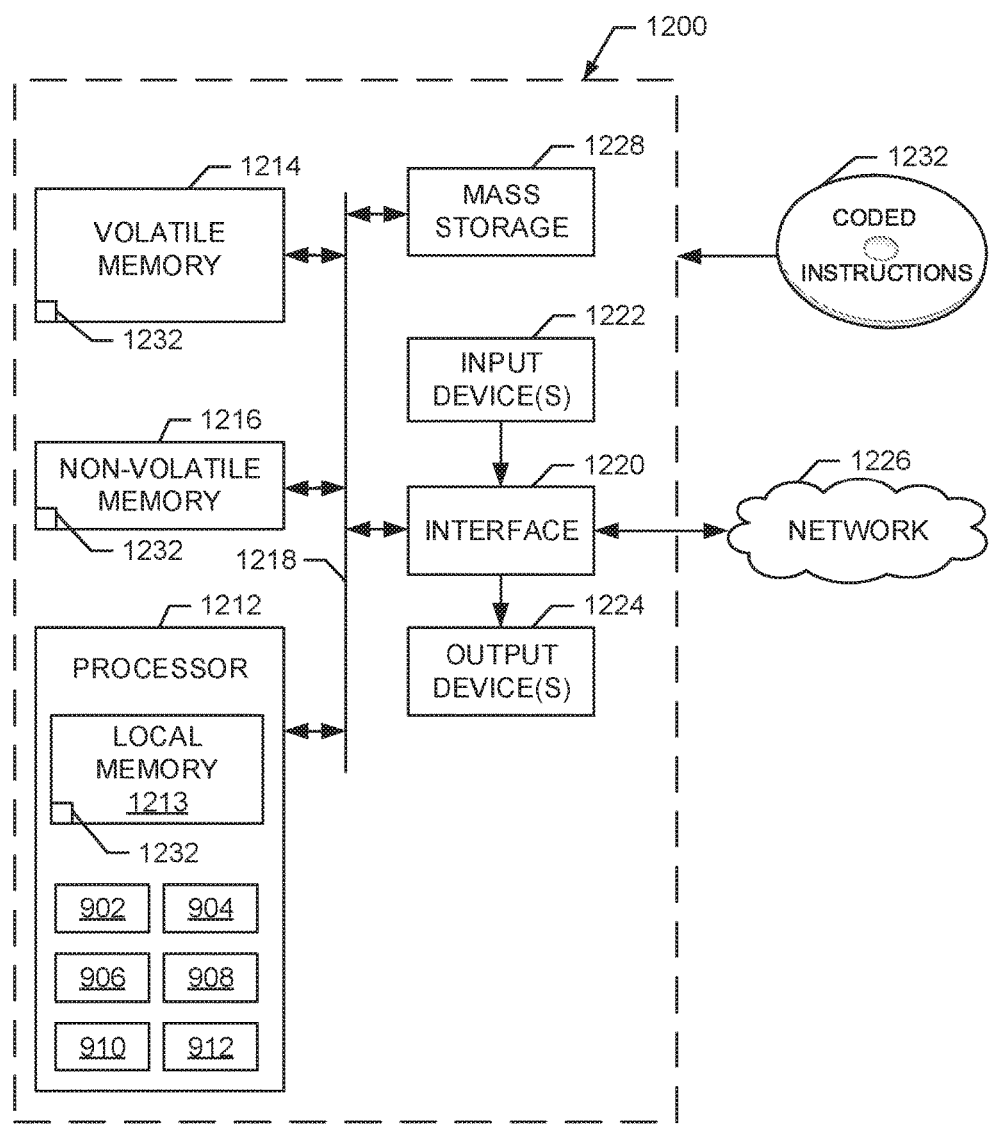
FIG. 12 is a block diagram of an example processor system structured to execute machine readable instructions to implement the example methods of FIGS. 10 and 11 and the example Flight Management System of FIG. 9.

FIG. 12 is a block diagram of an example processor platform 1200 capable of executing instructions to implement the methods 1000, 1100 of FIGS. 10 and 11 and the FMS 900 of FIG. 9. The processor platform 1200 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, or any other type of computing device.

The processor platform 1200 of the illustrated example includes a processor 1212. The processor 1212 of the illustrated example includes hardware that may implement one or more of the example Mach/CAS ETA determiner 902, the example Mach/CAS map generator 904, the example Mach/CAS criterion determiner 906, the example Mach/CAS selector 908, the example speed profile generator 910, and/or the example trajectory generator 912 of the example FMS 900 of FIG. 9. For example, the processor 1212 can be implemented by one or more integrated circuits, logic circuits, microprocessors or controllers from any desired family or manufacturer.

The processor 1212 of the illustrated example includes a local memory 1213 (e.g., a cache). The processor 1212 of the illustrated example is in communication with a main memory including a volatile memory 1214 and a non-volatile memory 1216 via a bus 1218. The volatile memory 1214 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1216 may be implemented by flash memory and/or any other desired type of memory device. Access to the main memory 1214, 1216 is controlled by a memory controller.

The processor platform 1200 of the illustrated example also includes an interface circuit 1220. The interface circuit 1220 may be implemented by any type of interface standard, such as an Ethernet interface, a universal serial bus (USB), and/or a PCI express interface.

In the illustrated example, one or more input devices 1222 are connected to the interface circuit 1220. The input device(s) 1222 permit(s) a user to enter data and commands into the processor 1212. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1224 are also connected to the interface circuit 1220 of the illustrated example. The output devices 1224 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1220 of the illustrated example, thus, typically includes a graphics driver card, a graphics driver chip or a graphics driver processor.

The interface circuit 1220 of the illustrated example also includes a communication device such as a transmitter, a receiver, a transceiver, a modem and/or network interface card to facilitate exchange of data with external machines (e.g., computing devices of any kind) via a network 1226 (e.g., an Ethernet connection, a digital subscriber line (DSL), a telephone line, coaxial cable, a cellular telephone system, etc.).

The processor platform 1200 of the illustrated example also includes one or more mass storage devices 1228 for storing software and/or data. Examples of such mass storage devices 1228 include floppy disk drives, hard drive disks, compact disk drives, Blu-ray disk drives, RAID systems, and digital versatile disk (DVD) drives.

Coded instructions 1232 to implement the methods 1000, 1100 of FIGS. 10 and 11 may be stored in the mass storage device 1228, in the volatile memory 1214, in the non-volatile memory 1216, and/or on a removable tangible computer readable storage medium such as a CD or DVD.

From the foregoing, it will be appreciated that the above disclosed methods, apparatus/systems and articles of manufacture enable the use of Mach/CAS combinations other than those restrained by CI-coupling. As a result, more effective Mach/CAS combinations can be implemented depending on the criterion.

Although certain example methods, apparatus/systems and articles of manufacture have been disclosed herein, the scope of coverage of this patent is not limited thereto. On the contrary, this patent covers all methods, apparatus/systems and articles of manufacture fairly falling within the scope of the claims of this patent. The description of the different advantageous implementations has been presented for purposes of illustration and description, and is not intended to be exhaustive or limited to the implementations in the form disclosed. Many modifications and variations may be apparent to those of ordinary skill in the art. Furthermore, different advantageous implementations may provide different advantages as compared to other advantageous implementations.

What is claimed is:

1. A method of controlling a flight of an aircraft subjected to a required time of arrival (RTA) constraint at a target waypoint, the method comprising:
    calculating, using an estimated time of arrival (ETA) determiner, during flight, combinations of cruise speed and descent speed for estimated times of arrival (ETAs) at the target waypoint;
    determining, using a criterion determiner, a subset of the combinations that introduce substantially a same amount of time change in the ETA when changing the corresponding cruise speed to a cruise speed limit, while maintaining the descent speed constant, as when changing the corresponding descent speed to a descent speed limit while maintaining the cruise speed constant;
    selecting, using a selector, a combination of the subset of the combinations having an ETA substantially equal to the RTA; and
    modifying at least one of a cruise speed or a descent speed of the aircraft based on the selected combination.

2. The method of claim 1, wherein the cruise speed limit includes a minimum cruise speed and the descent speed limit includes a minimum descent speed, and wherein determining the subset of the combinations includes determining a first set of combinations that introduce a same amount of time delay when the corresponding cruise speed is reduced to the minimum cruise speed as when the corresponding descent speed is reduced to the minimum descent speed.

3. The method of claim 2, wherein the cruise speed limit includes a maximum cruise speed and the descent speed limit includes a maximum descent speed, and wherein determining the subset of the combinations includes determining a second set of combinations that introduce a same amount of time anticipation when the corresponding cruise speed is increased to the maximum cruise speed as when the corresponding descent speed is increased to the maximum descent speed.

4. The method of claim 3, wherein the subset of the combinations further includes a third set of combinations having a cruise speed equal to an average of the minimum cruise speed and the maximum cruise speed.

5. The method of claim 1, wherein the cruise speed limit and the descent speed limit are based on at least one of a cruise altitude of the aircraft or a weight of the aircraft.

6. The method of claim 1, wherein the cruise speed limit and the descent speed limit are based on an aircraft spacing requirement.

7. The method of claim 1, wherein the combinations are based on at least one of a weight of the aircraft, a cruise altitude of the aircraft, a flight plan, an initial position or a weather condition.

8. A system to control a flight of an aircraft subjected to a required time of arrival (RTA) constraint at a target waypoint, the system comprising:
    an estimated time of arrival (ETA) determiner to calculate, during flight, combinations of cruise speed and descent speed for estimated times of arrival (ETAs) at the target waypoint;
    a criterion determiner to determine a subset of the combinations that introduce substantially a same amount of time change in the ETA when changing the corresponding cruise speed to a cruise speed limit, while maintaining the descent speed constant, as when changing the corresponding descent speed to a descent speed limit, while maintaining the cruise speed constant;
    a selector to select a combination of the subset of the combinations having an ETA substantially equal to the RTA; and
    a speed profile generator to generate a signal that modifies at least one of a cruise speed or a descent speed of the aircraft based on the selected combination.

9. The system of claim 8, wherein the cruise speed limit includes a minimum cruise speed and the descent speed limit includes a minimum descent speed, and the subset of the combinations includes a first set of combinations that introduce a same amount of time delay when the corresponding cruise speed is reduced to the minimum cruise speed as when the corresponding descent speed is reduced to the minimum descent speed.

10. The system of claim 9, wherein the cruise speed limit includes a maximum cruise speed and the descent speed limit includes a maximum descent speed, and the subset of the combinations includes a second set of combinations that introduce a same amount of time anticipation when the corresponding cruise speed is increased to the maximum cruise speed as when the corresponding descent speed is increased to the maximum descent speed.

11. The system of claim 10, wherein the subset of the combinations further includes a third set of combinations having a cruise speed equal to an average of the minimum cruise speed and the maximum cruise speed.

12. The system of claim 8, wherein the cruise speed limit and the descent speed limit are based on at least one of a cruise altitude of the aircraft or a weight of the aircraft.

13. The system of claim 8, wherein the cruise speed limit and the descent speed limit are based on an aircraft spacing requirement.

14. A tangible computer readable storage medium comprising instructions that, when executed, cause a machine to at least:
    calculate, during flight, combinations of cruise speed and descent speed for estimated times of arrival (ETAs) of an aircraft at a target waypoint;
    determine a subset of the combinations that introduce substantially a same amount of time change in the ETA when changing the corresponding cruise speed to a cruise speed limit, while maintaining the descent speed constant, as when changing the corresponding descent speed to a descent speed limit, while maintaining the cruise speed constant;
    select a combination of the subset of the combinations having an ETA substantially equal to a required time of arrival (RTA) constraint; and modify at least one of a cruise speed or a descent speed of the aircraft based on the selected combination.

15. The tangible computer readable storage medium of claim 14, wherein the cruise speed limit includes a minimum cruise speed and the descent speed limit includes a minimum descent speed, and the subset of the combinations includes a first set of combinations that introduce a same amount of time delay when the corresponding cruise speed is reduced to the minimum cruise speed as when the corresponding descent speed is reduced to the minimum descent speed.

16. The tangible computer readable storage medium of claim 15, wherein the cruise speed limit includes a maximum cruise speed and the descent speed limit includes a maximum descent speed, and the subset of the combinations includes a second set of combinations that introduce a same amount of time anticipation when the corresponding cruise speed is increased to the maximum cruise speed as when the corresponding descent speed is increased to the maximum descent speed.

17. The tangible computer readable storage medium of claim 16, wherein the subset of the combinations further includes a third set of combinations having a cruise speed equal to an average of the minimum cruise speed and the maximum cruise speed.

18. The tangible computer readable storage medium of claim 14, wherein the cruise speed limit and the descent speed limit are based on at least one of a cruise altitude of the aircraft or a weight of the aircraft.

19. The tangible computer readable storage medium of claim 14, wherein the cruise speed limit and the descent speed limit are based on an aircraft spacing requirement.

20. The tangible computer readable storage medium of claim 14, wherein the combinations are based on at least one of a weight of the aircraft, a cruise altitude of the aircraft, a flight plan, an initial position or a weather condition.

* * * * *